April 11, 1933.  J. BUCHEL  1,903,437
REFRIGERATING DEVICE
Filed Aug. 29, 1928   2 Sheets-Sheet 1
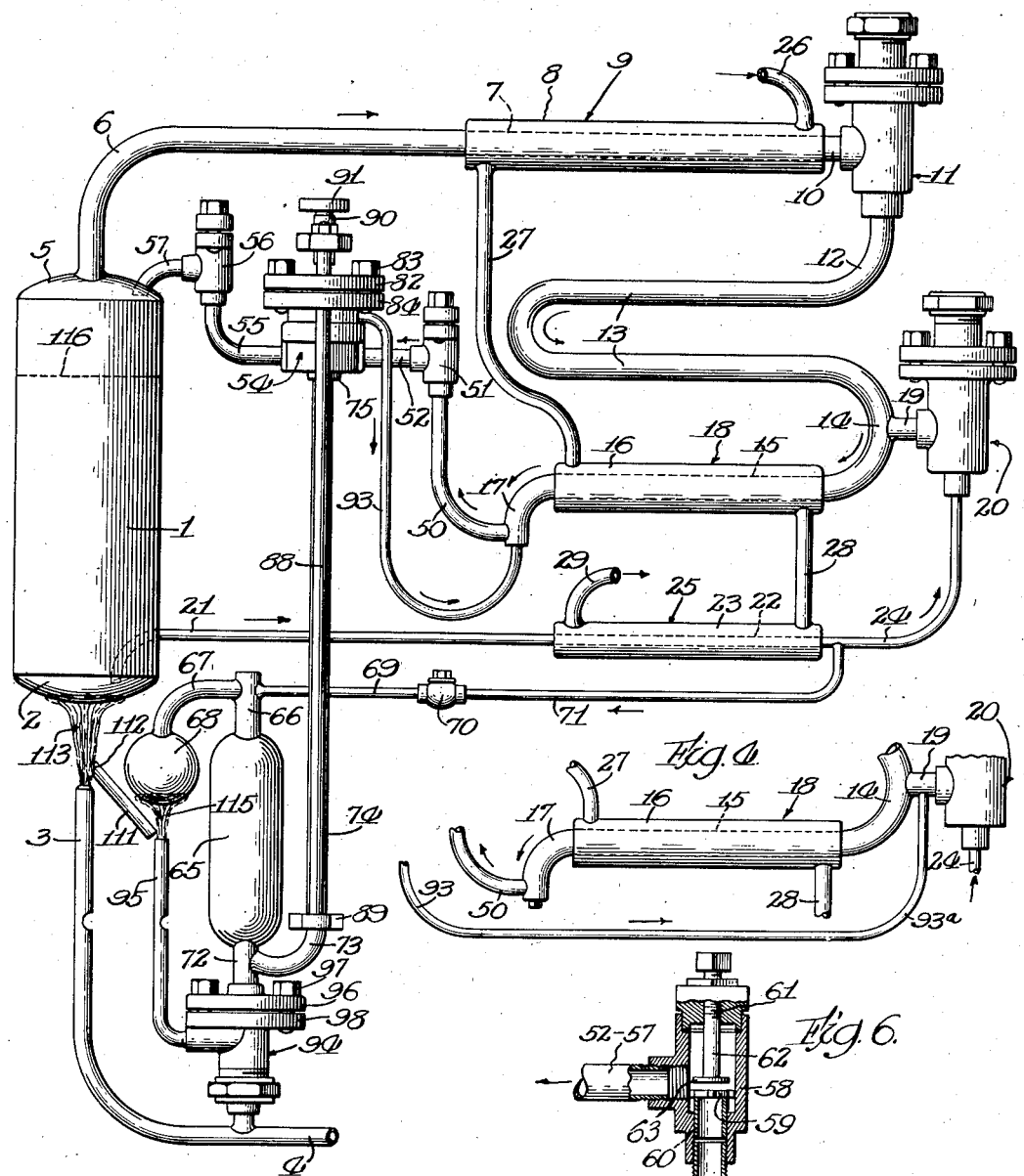

April 11, 1933. J. BUCHEL 1,903,437
REFRIGERATING DEVICE
Filed Aug. 29, 1928 2 Sheets-Sheet 2
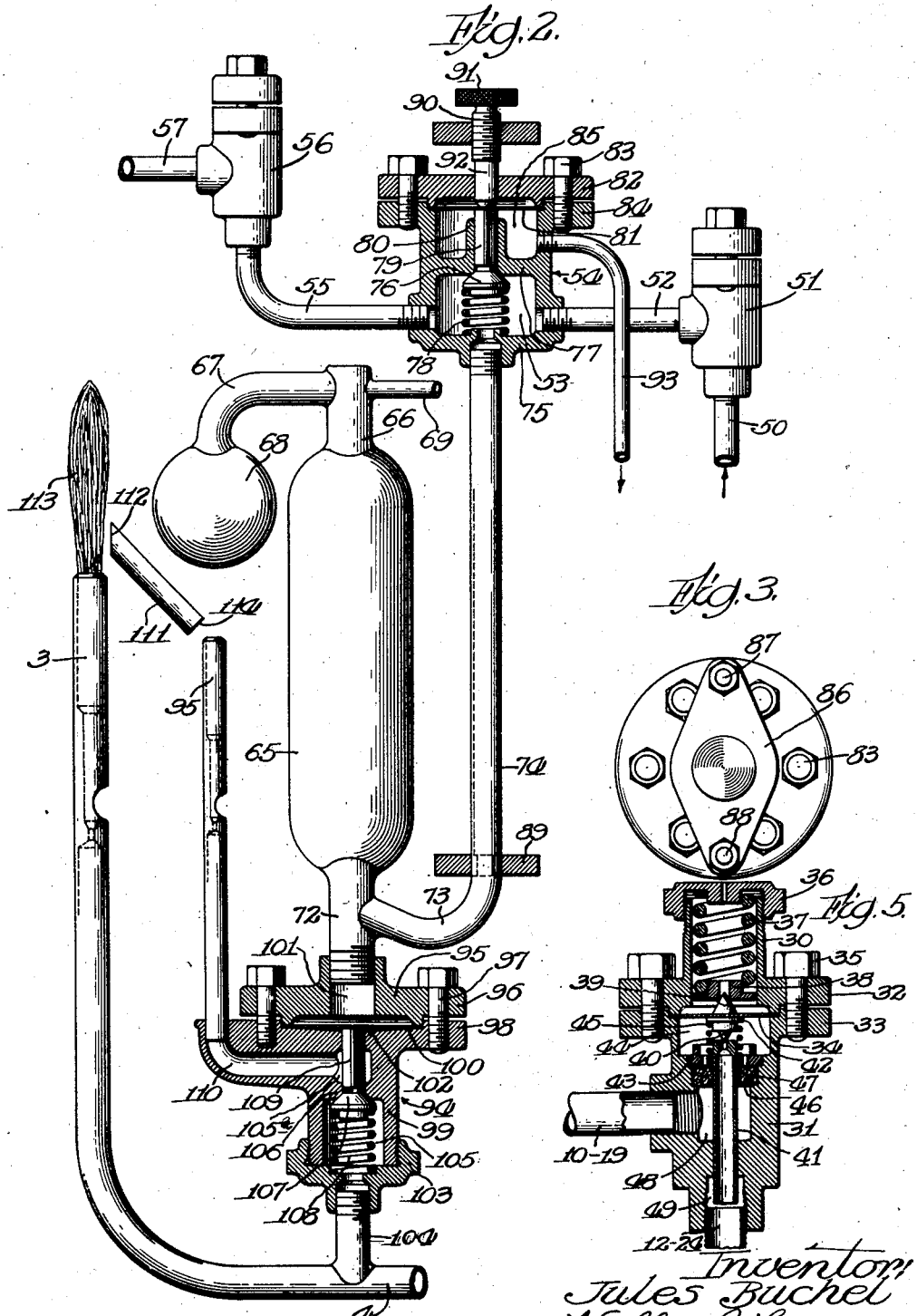

Patented Apr. 11, 1933

1,903,437

UNITED STATES PATENT OFFICE

JULES BUCHEL, OF NEW ORLEANS, LOUISIANA, ASSIGNOR OF ONE-HALF TO THE ESTATE OF CHARLES LOUQUE, ONE-TWENTIETH TO LESTER H. RAYNER AND ONE-TWENTIETH TO JOSEPH FREDERICK DUPUY, ALL OF NEW ORLEANS, LOUISIANA

REFRIGERATING DEVICE

Application filed August 29, 1928. Serial No. 302,760.

The invention relates to refrigerating systems or devices in which there is a continuous generation, condensation, refrigeration, and absorption of the refrigerating medium.

An object of the invention is to provide a novel device for carrying out a continuous refrigeration operation without the use of mechanical movements of any kind, thus eliminating all the disadvantages usually accompanying mechanical devices, such as pumps, motors, floats and the like.

Another object is to provide such a system which is operative wholly from the application and conversion of heat, as from the flames of gas burners; the usual cooling by air or water being used where desired.

Another object is to provide a "forcer" means capable of balancing the system by periodically returning the absorbed mixture for re-generation.

Other objects, capabilities, advantages, features and process steps are comprehended by the invention as will later appear and as are inherently possessed thereby.

Referring to the drawings:

Fig. 1 is a schematic or diagrammatic view of a system constructed in accordance with the invention.

Fig. 2 is a similar view, with parts in section, of the "forcer" portion of the system.

Fig. 3 is a top plan view of the "forcer" controlling means.

Fig. 4 is a fragmentary view showing an alternate "forcer" connection to the absorber part of the device.

Fig. 5 is a sectional view of a control valve, such as the expansion valve and the liquor control valve.

Fig. 6 is a sectional view of a check valve, such as the suction and discharge check valves.

Referring more in detail to the drawings, the embodiment selected to illustrate the invention comprises a container 1 acting as a generator in the system, the container being designed to contain a strong solution of aqua ammonia and capable of receiving heat at the lower end 2 thereof from any suitable source of heat, such as from a Buchel gas burner 3 connected to and receiving its fuel from a main gas supply line 4. The container has an upper closed end 5 to which is connected a vapor duct 6 having a portion 7 passing through a cooling jacket 8, the parts 7 and 8 forming a condenser 9 for liquefying the vapors therein at given pressure, such as about 140 lbs. per square inch and upward. The portion 7 is connected by duct 10 to an expansion valve 11 shown in detail in Fig. 5.

This valve is capable of being set to open at a given pressure, such as at 150 lbs. per square inch, to establish communication with a duct 12 leading to the freezing coils 13 suitably located in a cooling room or refrigerating box. The valve 11 acts as a reducing valve so as to release the liquefied ammonia into the coils 13 at a given low pressure, such as 15 lbs. per square inch. This released fluid boils in the coils 13, and in evaporating therein it absorbs heat from the medium surrounding said coils and is converted into a gas or vapor to be absorbed in an absorber later disclosed.

The coils are connected by a duct 14 to a duct 15 passing through a cooling chamber 16 and terminating in a receptacle 17. The parts 15 and 16 form or constitute an absorber 18. The duct 14 is also connected through a connection 19 to a liquor control valve 20 shown in detail in Fig. 5. Both the valves 11 and 20 are of identical construction. Valve 20, however, is set to open at a lower pressure than valve 11, such as at fifteen lbs. per square inch.

From the lower part of the generator container 1 leads a liquor duct 21 having a portion 22 passing through a cooling jacket 23, and connected by way of a duct 24 to the lower part of the valve 20. The parts 22 and 23 constitute a weak liquor cooler 25, the hot weak liquor proceeding, as shown by the arrows, from the lower part of container 1, through duct 21 to duct 22 where the liquor is cooled, and the cooled or cold liquid then proceeds through duct 24 into valve 20, and thence through connection 19 into duct 14 to unite or meet with the expanded cold ammonia gas therein for the purpose of absorbing the same. This absorbing action evolves heat and the mixture is passed through the absorber 18 to lower its temperature before it passes to the receptacle 17.

The cooling system shown comprises a water inlet 26 leading to an end of the condenser jacket 8; a duct 27 leading from the other end of jacket 8 to one end of jacket 16; another duct 28 from the other end of jacket 16 to an end of the liquor cooler jacket 23; and a discharge or waste duct 29 leading from the other end of jacket 23.

The details of valves 11 and 20 are shown in Fig. 5 and each such valve comprises a pair of hollow members 30 and 31 having flanges 32 and 33 respectively, between which is clamped a flexible metal, such as steel, diaphragm 34, bolts 35 being used to secure these parts firmly together. On the upper end of member 30 is adjustably threaded an adjusting member 36 suitably shouldered to act against an end of a spring 37, the other end of the spring being stressed against a shouldered member 38 recessed to fit against a central guiding cone 39 attached to the diaphragm 34.

Beneath the diaphragm 34 is located a valve 40 normally seated in the orifice of a tubular member 41 extending down into the member 31 and secured at its lower end to a lower part of said member 31. The valve 40 has a shouldered part 42 between which and an apertured disc 43 fixed in member 31 and beneath chamber 44 therein, reacts a spring 45, this spring being only of sufficient strength to normally press the valve against the diaphragm 34 as the latter moves to and fro. Below the apertured member 43 is a chamber 46 in which is located filtering material 47, such as cotton, wool or other like fibres, or any other suitable filtering material. Beneath chamber 46 is an inlet chamber 48 with which communicates either duct 10 or 19, as the case might be. The lower end of member 41 communicates with a chamber 49 in the lower part of member 31, this chamber being in communication with either duct 12 or 24 as the case might be. The screw 36 may be adjusted to effect the desired spring pressure for setting the valve for opening at a given pressure. In the case of using the valve as an expansion valve (as valve 11) and when the pressure in duct 10 and chambers 48, 46 and 44 has reached 150 lbs. per square inch, the diaphragm 34 moves upward and valve 40 permitted to open, and the fluid then passes through member 41 and duct 12 with a pressure of fifteen lbs. per square inch. In the case of using the valve as a liquor control valve (as valve 20) and when the pressure in duct 19 and chambers 48, 46 and 44 has reached or exceeds fifteen lbs. per square inch, the diaphragm rises and permits valve 40 to open, and the cold weak liquor passing from generator 1 under 150 or more lbs. pressure per square inch, moves upward through duct 24, member 41, into chamber 44, and thence through chambers 44, 46 and 48 to connection 19 and into duct 14 for absorption action in the absorber.

From receptacle 17 leads a duct 50 to a suction check valve 51, and from the latter leads a duct 52 into a chamber 53 of "forcer" control valve 54. From chamber 53 leads a duct 55 to a discharge check valve 56, and from the latter leads a duct 57 into the upper end of the generator container 1, and adapted to discharge thereinto. Both check valves are of identical construction and are shown in detail in Fig. 6 of the drawings.

Each of these valves comprises a hollow body 58 in which a flat thin metal valve disc 59 normally rests upon the upper end of a tubular seat member 60 secured at its lower end to a lower part of the body 58. In the upper part of the body is adjustably threaded a screw 61 carrying a stem 62 having at its lower end a disk form of stop 63 against which the valve 59 abuts when it opens, and is limited in movement thereby. The fluid enters by either duct 50 or 55 into tube 60, and when the valve 59 opens, thence to outlet duct 52 or 57 as the case may be.

The "forcer" feature of the invention comprises a forcer chamber 65 communicating at its upper end with a dome 66 connected through a duct 67 to a bulb 68, the dome 66 being also connected to a duct 69 leading from a check valve 70 connected to a duct 71 leading from duct 24 on the discharge side of the weak liquor cooler 25. The check valve 70 is so designed to permit only a very small flow of cold liquor therethrough to duct 69 and into dome 66 and forcer chamber 65. When the liquor is flowing from generator 1, under the pressure prevailing therein, about nine-tenths of it flows through duct 24 and valve 20 to the absorber, and about one-tenth of it flows through duct 71, check valve 70, and duct 69 to dome 66 and forcer 65.

The forcer chamber 65 communicates at its lower end with a stand pipe 72 leading to a duct 73 connected to the lower end of an expansion tube 74, the upper end of the latter being connected to the lower end 75 of the forcer control valve 54 and in communication with the chamber 53 therein.

In chamber 53 is a valve 76 normally held seated on a seat in a partition 77 in the valve body 54, by a spring 78 reacting between valve 76 and bottom 75 of the body 54. Valve 76 carries a fluted stem 79 slidable in tubular member 80, the upper end of the stem normally just contacting the under side of a flexible diaphragm 81 clamped between a shouldered part of the valve body and a cap 82 secured by bolts 83 threaded in flange 84 of the valve body. A chamber 85 is provided between partition 77 and diaphragm 81. Above cap 82 is located an upper yoke 86 connected by a pair of rods 87 and 88 by nuts, the rods leading down through suitable guide apertures provided in the flange portions of cap 82 and flange 84, to a lower yoke 89 secured to the lower end of the expansion tube 74. The upper yoke carries an adjusting screw 90 having threads of small pitch, the screw having a knurled head 91 and a smooth stem 92 slidable through an aperture provided in cap 82. The lower end of the stem 92 normally just contacts the top surface of diaphragm 81 when the valve 76 is seated or closed. When the expansion tube 74 expands, the lower yoke 89 and rods 87 and 88 are moved downward with the lower end of the expansion tube 74, and also upper yoke 86 and screw 90 will likewise move to cause stem 92 to slide down in cap 82 and depress the diaphragm 81 and force down the valve 76 to open it, thus establishing communication between chambers 53 and 85.

From chamber 85 leads a duct 93 which connects and communicates with the lower end of receptacle 17 at the discharge end of the absorber 18. In lieu of connecting this duct 93 to receptacle 17, it may, as shown in Fig. 4, be extended by way of a duct 93ª and connected to connection 19 between the absorber 18 and freezing coils 13, and liquor control valve 20.

The stand pipe 72 at the lower end of the forcer 65, is also connected to and communicates with a gas control valve 94 adapted to periodically admit and cut-off gas to an auxiliary Buchel burner located below bulb 68 to heat the contents thereof as will be later explained. The details of this control valve are shown in Fig. 2. It comprises a cap 95 having a rim or flange portion 96 which pass bolts 97 threaded to flange 98 of a body member 99. Both the cap 95 and body member 99 are shouldered to receive clamped therebetween a flexible metal diaphragm 100. The lower end of the stand pipe 72 communicates with chamber 101 above the diaphragm 100; thus subjecting the diaphragm to the pressure in forcer 65. Beneath the diaphragm 100, the body 99 has a shallow concaved surface 102 so machined in curvature to protect and sustain the flexed diaphragm 100 against overstrain. About fifty lbs. pressure per square inch is used to operate the diaphragm but the pressure in forcer 65 and chamber 101 may at times be very high, such as 200 lbs. per square inch. In the latter case the diaphragm will be supported and sustained on the curved surface 102.

The lower end of the body 99 of the valve carries a cap 103 connected by way of a duct 104 to the main gas supply duct 4. Within the body 99 are chambers 105 and 105ª separated by a partition 106 having a valve port in which is normally seated a valve 107 acted upon by a spring 108 reacting against cap 103. The valve has a fluted stem 109 with the upper end thereof in contact with the lower face of the diaphragm 100. Chamber 105 communicates by way of passage 110 with burner 95. Normally, valve 107 is closed, but when the pressure in forcer 65 reaches a given point, such as fifty lbs. per square inch, diaphragm 100 is depressed and opens valve 107, thus admitting gas from duct 4 by way of duct 104, chambers 105 and 105ª, and passage 110 to burner 95.

To ignite this burner, a small tube 111 is located in inclined position, as shown, with its upper end 112 slightly spaced from the flame 113 of the main burner 3, and its lower end 114 extending partly in the path of the issuing gases so that a small amount of gas and air mixture will be shunted up the tube 111 to flame 113. Inasmuch as this mixture is explosive it will be immediately ignited by the main flame 113 and flash back through tube 111 to ignite the auxiliary burner, resulting in auxiliary flame 115 as shown.

Normally and at the start of the operation of the device, the fluid, such as aqua ammonia or other like strong ammonia liquor, partly fills the generator container to a level, such as represented by line 116 in Fig. 1 of the drawings. The main gas burner is continuously operated, the auxiliary burner only being intermittently ignited and extinguished. All valves are normally closed, that is when starting operation.

In operation, the main flame 113 transmits heat through the bottom 2 of the generator 1 to cause a boiling of the contents therein. Ammonia gas and water vapor or steam then pass through duct 6 into duct 7 of the condenser 9, and when the pressure has reached about 140 lbs. per square inch, the gas and vapor or steam condenses and liquefies in the condenser duct 7. The liquid will accumulate therein until the pressure reaches that at which valve 11 is set, such as for example, 150 lbs. pressure per square inch. Upon the opening of valve 11, the liquefied ammonia gas is projected into the duct 12 and freezing coils 13 where the fluid boils or evaporates under a pressure of about 15 lbs. to the square inch. This evaporation of the fluid absorbs heat from the walls of the coils 13 as it is being converted into a gas. The freezing effect at the coils is about zero degrees Fahrenheit. By the time that the fluid reaches the juncture betwen duct 14 and connection 19, all has been converted into ammonia gas.

While the above operation is occurring, and as the pressure in the generator 1 is increasing, hot, weak liquor flows from the bottom of generator 1 through duct 21 to duct 22 in the cooler 25, thus lowering the temperature of the liquor. The cold liquor then flows to duct 24 and also to duct 71 through check valve 70, duct 69, and down the inside surfaces of the dome 66 and forcer chamber 65. This flow is very small, being a mere dribble or trickle. Eventually the "forcer"

65, dome 66 and bulb 68 will be filled with this cold liquor and the absorbed mixture from the absorber as will later appear.

When the pressure in the freezing tubes reaches 15 lbs. per square inch, valve 20 will open and admit cold liquor from duct 24, to discharge the same through duct 19 and into duct 14 to be mixed with the gas therein. This will cause an absorption of the gas in the liquor with attendant heat and rise in temperature. The mixture then proceeds through absorber duct 15 in absorber 18, and is cooled. In practice this absorber is long so as to cause the mixture to travel far enough to be fully cooled and to complete the absorption action. The cooled mixture then flows into receptacle 17 and through duct 50, check valve 51, duct 52, into chamber 53 of forcer control valve, down in expansion tube 74, duct 73, stand pipe 72, and into forcer chamber 65 to complete filling the same, as well as dome 66, duct 67 and bulb 68. This filling may be effected before valve 11 opens. Inasmuch as this liquor is cold, there is no expansion of tube 74, and valve 76 in the forcer control valve 54 will remain closed.

Flow of liquor will slowly continue through ducts 21, 22, 71, check valve 70 and duct 69 so as to increase the pressure in the forcer 65. Back flow through tube 74 and chamber 53 is prevented by the closing of check valve 51. Check valve 56 is held closed by the pressure in generator 1 acting through duct 57. When the pressure then reaches about 50 lbs. in forcer 65, diaphragm 100 in gas control valve 94, will be depressed to open gas valve 107, thus admitting gas to the auxiliary burner, which gas is ignited automatically from the main flame 113 as above described. The auxiliary flame 115 heats the bulb 68 and causes its contents to boil and be converted rapidly into gas or vapor and also to rapidly increase the pressure in the chamber 65. This pressure may reach as high a point as 200 lbs. The effect is to close check valve 70, and to force out the liquid in forcer 65, through stand pipe 72, duct 73, expansion tube 74, chamber 53, duct 55, check valve 56, duct 57, into generator 1.

Inasmuch as the heat is applied to the bulb 68 the contents of which is above the contents of forcer 65 the contents flowing down and out of forcer 65 will be comparatively cold. It is only when all of this liquid contents has been discharged from the forcer, will the following hot contents and hot gases then pass upward in expansion tube 74. The temperature of these fluids may be about 360° F. The upward passage of the hot fluids through tube 74 heats it and causes it to expand. Its lower end moves downwardly, carrying with it, lower yoke 89, rods 87 and 88. upper yoke 86, and screw 90 with stem 92. The latter depresses diaphragm 81 and valve stem 79, and causes valve 76 to open. The fluid will then pass from chamber 53 to chamber 85 and out through duct 93, (or 93 and 93ª) to and into the absorber where the pressure is only about 15 lbs. The release of the fluid through valve 76 is such as to rapidly reduce the pressure in the forcer and connected parts to that in the absorber, and when the pressure in the forcer falls below 50 lbs., the spring 108 immediately closes gas valve 107 to extinguish the auxiliary flame 115. The bulb 68 rapidly cools, thus effecting a reduction of pressure which may become a vacuum, and fluid, cooled in the absorber, will now pass through duct 93 to chambers 85 and 53, or through duct 50, check valve 51, duct 52 to chamber 53, or both, until the cool fluid descends tube 74 to cool it and cause it to contract. This results in closing the valve 76, and further flow is by way of duct 50, check valve 51, chamber 53, tube 74, to the end of again filling forcer 65, as before.

In the meanwhile, when the pressure in the forcer had fallen below that in the generator, cold liquid flowed from cooler 25 by way of duct 71, valve 70, duct 69 and dome 66. The slow flowing-in of this liquor at this time, causes the liquor to promptly absorb most of the remaining ammonia gas, thus aiding in the rapid reduction of pressure below that in the absorber and even to producing a partial vacuum. The flowing of the strong liquor from the absorber through duct 50, valve 51, duct 52, tube 74, and into forcer 65 fills the latter more or less rapidly.

The motive power to operate the forcer cycle is derived from the heat supplied by the auxiliary burner and the pressure supplied from the generator by way of ducts 21 and 71, this pressure being in fact a function of the heat supplied by the main burner. The weak liquor supplied to the forcer under the generator pressure, serves to bring the forcer up to the generator pressure and of applying auxiliary heat, and when the cycle is reversed, of absorbing the residual gas (ammonia gas) in the forcer to effect and maintain a reduced pressure therein for flow of the strong liquor from the absorber to the forcer. It is thus apparent that one phase of the cycle is operated by pressure and the other by heat. This, therefore, is a heat machine without mechanical movements, such as ball floats and other mechanical devices. The action is reliable and when once properly adjusted, the device operates indefinitely without attention.

While the cooling parts have been disclosed as a water cooling system, it is to be understood that air cooling is also contemplated, by the use of heat radiation fins in lieu of water jackets.

The cubical capacity of the bulb 68 is sufficient to hold contents which when vaporized will completely expel the contents of the forcer 65, and still leave the bulb about half full of liquor.

Although the action of the forcer appears to be intermittent, the system as a whole is continuous in its operation of effecting refrigeration, because the ammonia gas in condenser 9 is being liquefied and being effluxed continuously from the orifice of the expansion valve 11 into the freezing pipes or coils 13. Absorption is also continuously taking place in the absorber 18 and the supply of weak cold liquor through valve 20 is in a steady stream to meet and absorb the ammonia gas from the freezing coils 13.

While I have herein described and upon the drawings shown an illustrative embodiment of the invention, it is to be understood that the latter is not limited thereto but may comprehend other details, arrangements of parts, structures, and features without departing from the spirit of the invention.

Having thus disclosed the invention, I claim:

1. A refrigerating device comprising a generator, a freezer, an absorber, means for receiving absorbed material, and heat exchange means for forcing received material to the generator.

2. A refrigerating device comprising a generator, a freezer, an absorber, means for receiving absorbed material, and means for heating the material in the upper part of the receiving means for forcing the material from the receiving means to the generator.

3. A forcer for a refrigerating device, comprising a chamber having upper and lower ports, means communicating with said upper port and adapted when heated to cause expansion of fluid therein and in said chamber to force out the material in said chamber through said lower port, and means connected to said lower port for conducting the forced out material to a part of said refrigerating device.

4. A forcer for a refrigerating device, comprising chambers mutually communicating at their upper parts, one of said chambers having an outlet associated with a part of the refrigerating device, another of said chambers being capable of being heated for expanding the contents thereof for forcing the contents of said first chamber downward to and through said outlet.

5. A forcer for a refrigerating system, comprising a forcer chamber, an expandible duct connected with the lower end of said forcer chamber, an expansion chamber connected with the upper end of said forcer chamber, and means controlled by said expandible duct to reduce the pressure in said chambers and cause a discharge of the contents of said forcer chamber.

6. A forcer for a refrigerating system, comprising a forcer chamber, an expandible duct connected with the lower end of said forcer chamber, an expansion chamber connected with the upper end of said forcer chambers, means for heating said expansion chamber, and control means for said burner and connected to one of said chambers for causing said burner to operate.

7. A refrigerating system comprising a generator, a freezer connected to said generator, an absorber connected to said freezer, a forcer connected to said absorber, and a connection from said generator to said absorber and said forcer.

8. A refrigerating system comprising a generator, a freezer connected to said generator, an absorber connected to said freezer, a forcer connected to said absorber, a connection from the lower part of said forcer to the upper part of said generator, and a connection from the lower part of said generator to the upper part of said forcer.

9. A refrigerating system comprising a generator, a freezer connected to said generator, an absorber connected to said freezer, a forcer connected to said absorber, a connection from the connection between the forcer and absorber to the upper part of said generator, and a connection from the lower part of said generator to the upper part of said forcer.

10. A refrigerating system comprising a generator, a freezer connected to said generator, an absorber connected to said freezer, a forcer connected to said absorber, a connection from the connection between the forcer and absorber to the upper part of said generator, a connection from the lower part of said generator to the upper part of said forcer, and a connection from said last mentioned connection to the inlet of said absorber.

11. A method of continuous refrigeration, comprising continuously generating and liquefying a gas under pressure from a gas bearing liquor, producing refrigeration by continuous vaporization of the liquefied gas under diminished pressure, continuously using a part of said liquor for absorbing said vaporized gas, and thermally expanding a liquid in such a manner as to subject the resultant saturated liquor and absorbed gas to increased pressure for returning the same to the gas bearing liquor.

12. A method of continuous refrigeration, comprising continuously generating and liquefying a gas under pressure from a gas bearing liquor, producing refrigeration by continuous vaporization of the liquefied gas under diminished pressure, continuously using a part of said liquor for absorbing said vaporized gas, thermally expanding another part of the last mentioned liquor in such a manner as to subject the resultant saturated liquor and absorbed gas to increased pressure for returning the same to the gas bearing liquor, and then diminishing the latter pressure to that of the vaporized liquefied gas.

13. A method of continuous refrigeration, comprising continuously generating and liquefying a gas under pressure from a gas bearing liquor, producing refrigeration by continuous vaporization of the liquefied gas under diminished pressure, continuously using a part of said liquor for absorbing said vaporized gas, conducting the resultant saturated liquor and absorbed gas to a "forcer" locus, and thermally expanding a liquid in such a manner as to increase the pressure of the liquor in said locus for forcing the same back to said gas bearing liquor.

14. A method of continuous refrigeration, comprising continuously generating and liquefying a gas under pressure from a gas bearing liquor, producing refrigeration by continuous vaporization of the liquefied gas under diminished pressure, continuously using a part of said liquor for absorbing said vaporized gas, conducting the resultant saturated liquor and absorbed gas to a "forcer" locus, thermally expanding a liquid in such a manner as to increase the pressure of the liquor in said locus for forcing the same back to said gas bearing liquor, and then diminishing the latter pressure to that of the vaporized liquefied gas.

15. A method of continuous refrigeration, comprising continuously generating and liquefying a gas under pressure from a gas bearing liquor, producing refrigeration by continuous vaporization of the liquefied gas under diminished pressure, continuously using a part of said liquor for absorbing said vaporized gas, conducting the resultant saturated liquor and absorbed gas to a "forcer" locus, conducting another part of said gas bearing liquor to said locus for increasing the pressure therein, and forcing the saturated liquor and absorbed gas from said locus under pressure to said gas bearing liquor, and then diminishing the pressure at said locus to that of the vaporized liquefied gas.

16. A method of continuous refrigeration, comprising continuously generating and liquefying a gas under pressure from a gas bearing liquor, producing refrigeration by continuous vaporization of the liquefied gas under diminished pressure, continuously using a part of said liquor for absorbing said vaporized gas, conducting the resultant saturated liquor and absorbed gas to a "forcer" locus, conducting another part of said gas bearing liquor to said locus for increasing the pressure therein, applying heat to the upper part of said liquor at said locus to increase the pressure thereof, and discharging the liquor from said locus to said gas bearing liquor.

17. A method of forcing in refrigeration, comprising conducting a gas bearing liquor from an absorber to a forcing locus, applying heat to the upper part of the liquor in said locus to increase the pressure thereof, conducting the compressed liquor to a generating part of the refrigeration system, and removing the heat to cause a reduction of pressure of said liquor.

18. A method of forcing in refrigeration, comprising conducting a gas bearing liquor from an absorber to a forcing locus, evaporating the upper part of said liquor to cause an increase of pressure therein, conducting the compressed liquor to a generating part of the refrigeration system, and releasing the pressure at said locus.

19. A refrigerating device comprising a generator, a freezer connected to said generator and for receiving a generated fluid from said generator, an absorber connected to said freezer and for receiving fluid acted upon by said freezer, and a heat exchange forcer connected to said generator, freezer and absorber and for balancing the conditions among the same while continuously generating, freezing and absorbing.

20. A method of forcing in refrigeration, comprising confining liquor from an absorber in a forcer chamber, discharging the liquor from the chamber by thermally expanding a liquid in a manner to increase the pressure upon said liquor, and then reducing said pressure.

21. A method of forcing in refrigeration, comprising subjecting a gas bearing liquor from an absorber of the refrigerating system to pressure applied by means of a thermally expanded liquid and thereby ejecting a substantial portion of said compressed liquor, and then reducing the pressure on the residue of said liquor.

In witness whereof, I hereunto subscribe my name to this specification.

JULES BUCHEL.